United States Patent
James

(10) Patent No.: US 10,521,689 B2
(45) Date of Patent: Dec. 31, 2019

(54) APPARATUS AND METHOD FOR DETECTING ENTITIES IN AN IMAGE

(71) Applicant: SARONIKOS TRADING AND SERVICES, UNIPESSOAL LDA, Funchal, Madeira (PT)

(72) Inventor: Robert James, Hatfield (GB)

(73) Assignee: Saronikos Trading and Services, Unipessoal LDA, Funchal, Madeira (PT)

( * ) Notice: Subject to any disclaimer, the term of this patent is extended or adjusted under 35 U.S.C. 154(b) by 184 days.

(21) Appl. No.: 15/543,109

(22) PCT Filed: Jan. 14, 2015

(86) PCT No.: PCT/EP2015/050580
§ 371 (c)(1),
(2) Date: Jul. 12, 2017

(87) PCT Pub. No.: WO2016/112972
PCT Pub. Date: Jul. 21, 2016

(65) Prior Publication Data
US 2018/0012104 A1   Jan. 11, 2018

(51) Int. Cl.
  *G06K 9/00*  (2006.01)
  *G06K 9/46*  (2006.01)

(52) U.S. Cl.
  CPC ....... *G06K 9/4642* (2013.01); *G06K 9/00369* (2013.01); *G06K 9/00771* (2013.01); *G06K 9/00973* (2013.01)

(58) Field of Classification Search
  CPC ........... G06K 9/00369; G06K 9/00771; G06K 9/00973; G06K 9/4642
  (Continued)

(56) References Cited

U.S. PATENT DOCUMENTS

| 8,189,866 B1 * | 5/2012 | Gu ..................... G06K 9/00335 348/169 |
| 8,285,655 B1 * | 10/2012 | Medasani .......... G06K 9/00973 706/14 |

(Continued)

OTHER PUBLICATIONS

Calum Blair et al., *Characterizing a Heterogeneous System for Person Detection in Video Using Histograms of Oriented Gradients: Power Versus Speed Versus Accuracy*, IEEE Journal on Emerging and Selected topics in Circuits and systems, vol. 3, No. 2, Jun. 1, 2013, pp. 236-247.

(Continued)

*Primary Examiner* — Charlotte M Baker
(74) *Attorney, Agent, or Firm* — Workman Nydegger

(57) ABSTRACT

An apparatus and a method are provided for detecting entities in a numerical image, wherein the apparatus includes a computing unit configured for detecting, based on a histogram vector determined on the basis of gradient and partitioning information, the presence of at least one of the entities in the image, a signaling unit in signal communication with the computing unit, and configured for being activated when the computing unit detects the presence of at least one of the entities in the image, memory containing partitioning information, and configured for allowing access to the partitioning information on the basis of the gradient information, wherein each piece of partitioning information identifies at least one of the partitioning elements that allow the computing unit to quantize the gradient information.

13 Claims, 4 Drawing Sheets

(58) Field of Classification Search
USPC .................. 382/103, 224; 348/169; 706/14
See application file for complete search history.

(56) References Cited

U.S. PATENT DOCUMENTS

| | | | |
|---|---|---|---|
| 8,538,081 B2 * | 9/2013 | Ding | G06K 9/4642 |
| | | | 382/103 |
| 2011/0002507 A1 * | 1/2011 | Kuoch | B60R 21/0134 |
| | | | 382/103 |

OTHER PUBLICATIONS

Meihua Xu et al., *Optimization Algorithm and Implementation of Pedestrian Detection*, Advances in Swarm Intelligence, Jun. 12, 2013, XP047028671, pp. 428-435.
Shuai Xie et al., *Binarization Based Implementation for Real-Time Human Detection*, 2013 23$^{rd}$ International Conference on Field Programmable Logic and Applications, IEEE, Sep. 2, 2013, pp. 1-4.
Jiye Duan et al., *Pedestrian Detection Image Processing with FPGA, A Major Qualifying Project Report*, Apr. 30, 2014, XP055216756, pp. 1-70.
C. Bourrasset et al., *FPGA Implementations of Histograms of Oriented Gradients in FPGA*, Workshop on Architecture of Smart Camera 2013, Jun. 3, 2013, XP055216755, pp. 1-45.
International Search Report and Written Opinion dated Sep. 29, 2015, issued in PCT Application No. PCT/EP2015/050580, filed Jan. 14, 2015.

* cited by examiner

APPARATUS AND METHOD FOR DETECTING ENTITIES IN AN IMAGE

BACKGROUND OF THE INVENTION

1. The Field of the Invention

The present invention relates to an apparatus and a method for detecting entities in an image.

2. The Relevant Technology

As is known, safety and security are very important in modern society. Systems have for many years become increasingly widespread which allow for automatic detection of entities (such as people and/or objects) that may be present in digital images like those normally acquired by video cameras.

A first example of a safety system is given by pedestrian detection systems included in many cars now available on the market; such systems acquire digital images from a video camera (usually positioned in the upper part of the windscreen) and process them for detecting a pedestrian that may be in front of the vehicle and estimating the distance therefrom, so as to be able to decide if an assisted maneuver needs to be carried out in order to protect the pedestrian(s) (e.g., increasing the pressure in the braking system, emergency braking, avoiding the pedestrian, or the like).

An example of a security system is given by video surveillance systems capable of automatically detecting the presence of people and/or vehicles (and even the type of vehicle) in an image, and of taking the necessary actions (e.g., starting the recording of the video stream, highlighting the entity by means of a picture superimposed on the video stream, warning a surveillance operator, or the like), thus not requiring a physical surveillance operator to continuously watch the video stream.

Both of these applications are implemented through computer means configured for executing a detection method based on the Histogram of Oriented Gradients (HOG) and Support Vector Machine (SVM) techniques.

In such applications, one of the most important requirements of these detection methods is to produce as few as possible false positives/negatives, because both a false positive and a false negative might lead to unpleasant consequences; in fact, a false negative might lead, for example, to a person being knocked down or a surveillance operator not being warned about an intrusion attempt, whereas a false positive might lead, for example, to unnecessary emergency braking (with the risk of rear-ending) or too many false alarms being signaled to a video surveillance operator (with the risk that the operator's attention level will decrease).

One way to reduce the number of false positives/negatives generated by HOG/SVM-based methods is to increase the resolution of the image processed by such methods, so as to be able to generate histograms of oriented gradients with a greater number of classes and/or with a greater difference among the elements contained in the various classes, thus ensuring higher entity detection accuracy (reduction in the number of false positives/negatives) and/or the recognition of a greater number of distinct entities; in this latter case, a HOG/SVM-based method can be used for discerning between a pedestrian crossing the street and a person running along the edge of the street, or for discerning between a normally dressed person and a person wearing a balaclava, may be for the purpose of not being recognized while performing a criminal action.

However, the increased resolution implies, the available computing power being equal, an increase in the computational load, which limits the use of HOG/SVM-based methods in practical applications like those described above, since stringent time constraints need to be met, which make such applications become real-time applications).

In order to meet these time constraints, it is therefore necessary to increase the number of points (pixels) of an image that can be processed within a time unit by an apparatus configured for executing instructions for implementing a HOG/SVM-based image detection method.

SUMMARY OF THE INVENTION

The present invention aims at solving these and other problems by providing an apparatus and a method for entity detection as set out in the appended claims.

The basic idea of the present invention is to perform a quantization of the angle of the gradient of at least one point of the image on the basis of predetermined partitioning elements (bins), by selecting one datum which identifies at least one of said partitioning elements and which is contained in memory means configured for allowing access to at least one of said partitioning elements on the basis of the properties of said gradient, preferably the horizontal and vertical components of said gradient.

A further basic idea of the present invention is to compute the projection of the modulus of the gradient on at least one of the partitioning elements, by selecting a second datum contained in said memory means, which are configured for allowing access to said second datum on the basis of the properties of said gradient.

These features allow reducing and/or zeroing the number of floating-point operations that need to be executed by hardware components, thereby reducing the time complexity of the method according to the invention, i.e., speeding up the processing of the gradients associated with the points of an image, the computational power being equal. This increases the quantity of image points that can be processed per time unit.

A further effect produced by such technical features is a reduced number of circuit components required for implementing the method of the invention, leading to reduced spatial occupation (also called silicon occupation) of the circuitry.

In addition, the resolution of the acquired images and the available computational power being equal, the above-mentioned technical features allow reducing the time necessary for detecting a particular entity in a photograph, thus making the apparatus and method of the invention also particularly suitable for digital photography applications, wherein the automatic focusing of a subject usually requires detecting any one part thereof (e.g., the face). In this manner, it is possible to reduce the time taken by the machine for focusing, thereby also reducing the time necessary for obtaining a properly focused photograph.

Further advantageous features of the present invention will be set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein.

DETAILED DESCRIPTION OF THE PREFERRED EMBODIMENTS

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 1:
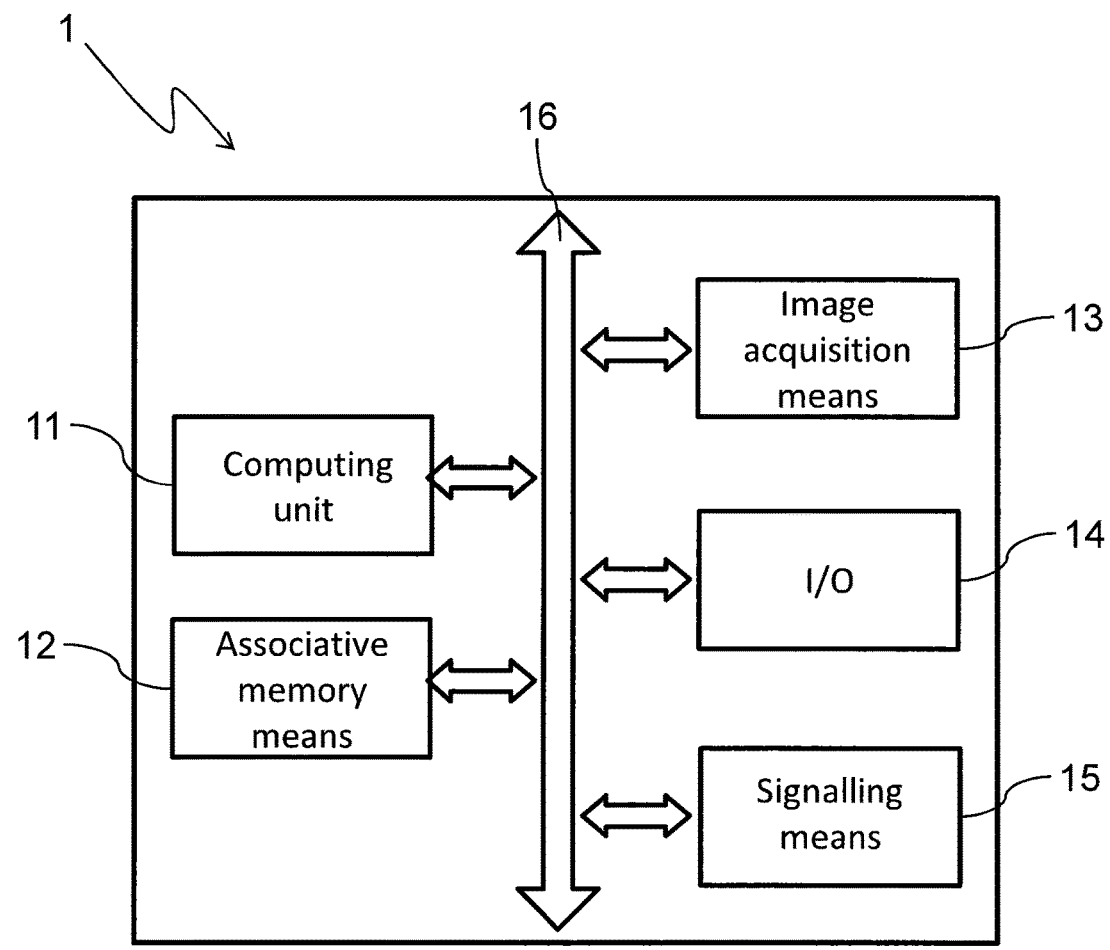
FIG. 1 is a block diagram of an electronic apparatus according to the invention.

With reference to FIG. 1, an electronic apparatus 1 according to the invention comprises the following components:

at least computing means 11 (such as, for example, a CPU, an FPGA, a CPLD, or the like), configured for reading or computing data representing the gradient of an image and for executing instructions implementing the method for detecting one or more entities that may be present in said image, in accordance with the invention; in particular, the computing means 11 detect the presence of a set of points (or areas) in the image having certain characteristics, e.g., a certain angular distribution of the gradient, which make that set of points (or areas) similar to a particular entity (e.g., a person, a vehicle, etc.) defined beforehand;

memory means 12 containing at least one data set and configured for allowing access to at least one of said data according to the value of at least one characteristic of the gradient of at least one point of the image, wherein each one of said data allows the computing means 11 to perform the quantization of the angle of the gradient of said point on the basis of predetermined partitioning elements (bins); furthermore, each one of said data may also allow computing the projection of the modulus of the gradient on at least one of the partitioning elements;

image acquisition means 13 configured for acquiring one or more images in numerical format, which are then processed by the computing means 11; such image acquisition means 13 may comprise, for example, a USB, Firewire, RS232, IEEE 1284, Ethernet, or WiFi adapter, or the like;

input/output (I/O) means 14, which can be used, for example, for connecting to said apparatus man-machine interface peripherals (also referred to as HID peripherals, such as a keyboard, a mouse, or the like) allowing a human operator to control the operation of the apparatus 1 (e.g., setting the operating mode, selecting a particular video source, or the like); such input/output means 14 may comprise, for example, a USB, Firewire, RS232, IEEE 1284, Ethernet, or WiFi adapter, or the like;

signaling means 15, configured for being activated by the computing means 11 when said computing means 11 detect the presence, in an image acquired through the image acquisition means 13, of a set of points having characteristics similar to those of a previously defined entity; such signaling means 15 may comprise an audible alarm, means configured for sending an interrupt over a data bus (e.g., a CAN-BUS of a car), actuating means that may, for example, actuate the braking circuit of a car, or the like;

a communication bus 16, allowing the exchange of information among the computing means 11, the memory means 12, the image acquisition means 13, the input/output means 14, and the signaling means 15.

As an alternative to the communication bus 16, the computing means 11, the memory means 12, the image acquisition means 13, the input/output means 14 and the signaling means 15 may be connected by means of star architecture.

Furthermore, the apparatus 1 may preferably also comprise a video adapter (not shown in the annexed drawings) in signal communication with at least the computing means 11 and the memory means 12, wherein said video adapter can display, on display means (e.g., an LCD or plasma panel or the like, not shown in the annexed drawings), the unprocessed image and/or the processing results, e.g., by highlighting the areas selected by the computing means 11 with continuous lines in a bright color (e.g., red, green or the like) superimposed on the image, so as to allow the operator of the apparatus 1 to rapidly locate the entity detected by the method of the invention carried out by the computing means 11.

The memory means 12 may consist of an associative memory, i.e., a Content Addressable Memory (CAM), or a normal RAM memory; such memory means 12 are used for implementing a look-up table which is so organized that the key of said table comprises the characteristics of the gradient, while the content associated with said key comprises the data set used for the quantization of the angle of the gradient, and also, optionally, for the computation of the projection of the modulus of said gradient on at least one of the predetermined partitioning elements.

If the memory means 12 consist of a RAM memory, the elements of the data set may advantageously be allocated, by using the knowledge of the man skilled in the art, in such a way that the L-value of the datum associated with certain characteristics of the gradient can be determined on the basis of said characteristics. In addition, said RAM memory may also preferably contain instructions for implementing the method of the invention, image data representing at least one portion of said image, preferably in binary format, and the result of the execution of the instructions of said method; said result may comprise the image points that have certain characteristics, e.g., a certain angular distribution of the gradient, which make that set of points (or areas) similar to a particular entity, and/or the contours of the image areas that contain said points, wherein said contours can be represented as a set of points (e.g., an array containing the coordinates of the points that define an area), and also as mathematical relations defining shapes, preferably rectangles, the generation of which will be described below.

The man skilled in the art may also use memory means other than those described above (e.g., ROM, Flash, etc.), without however departing from the teachings of the present invention.

Figure 2:
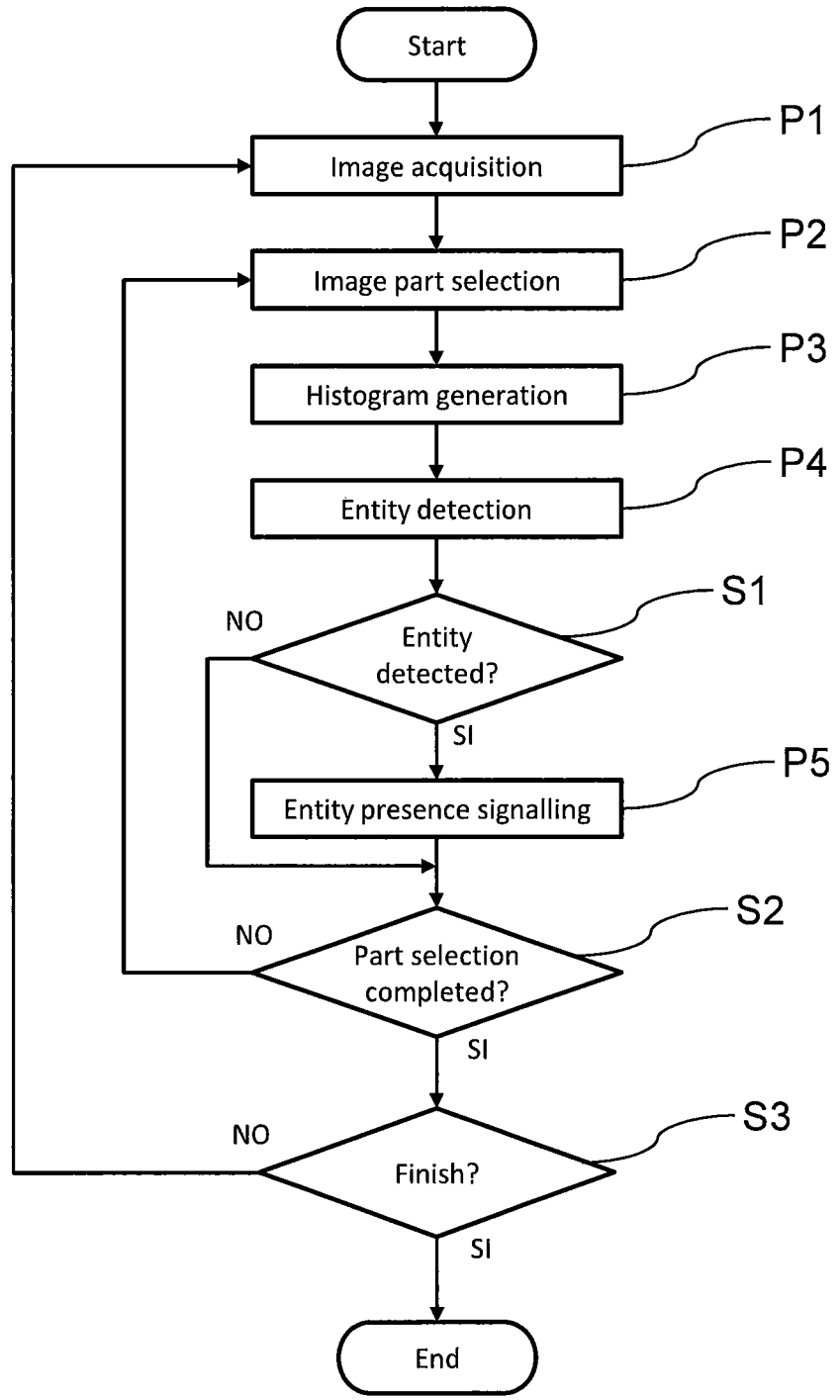
FIG. 2 is a flow chart that shows the various phases of a detection method based on the HOG (Histogram of Oriented Gradients) and SVM (Support Vector Machine) techniques that can be executed by the electronic apparatus of FIG. 1.

Also with reference to FIG. 2, the method according to the invention comprises the following phases:

an acquisition phase P1, wherein, through the image acquisition phases 13, the apparatus 1 acquires an electronic image that will then be processed by the computing means 11;

a selection phase P2, wherein the apparatus 1, preferably through the computing means 11, selects a portion of the image acquired during phase P1 to be processed by said computing means 11, wherein said portion is identified by a shape, a size and a position relative to a given point of the image, and wherein each shape, size and position is contained in a selection set, so that the apparatus 1 can select, preferably in a sequential manner, image portions having predetermined characteristics; this will make an entity's detection time predictable;

a histogram generation phase P3, wherein, through the computing means 11, a histogram vector is generated on the basis of the points of the image portion;

an entity detection phase P4, wherein, through the computing means 11, it is verified if the histogram vector generated during phase P3 is similar to that of one of the entities that must be (automatically) detected;

an entity presence signaling phase P5, wherein, if an entity was detected in the selected image portion at phase P4, such presence will be signaled, through the signaling means 15, to a human operator and/or a supervision system and/or the like.

When the apparatus 1 gets into an operating condition, it starts executing phase P1 to acquire an image; it then carries out phase P2 to select a first image portion, followed by phase P3 to determine a histogram vector, and then, based on said histogram vector, by phase P4. Subsequently, on the basis of the result obtained during phase P4, the apparatus 1 makes a first choice S1: if there is at least one entity in the image acquired during phase P1, the apparatus 1 will carry out phase P5 to activate the signaling means 15. Afterwards, the apparatus 1 will make a second choice S2, verifying if all of the image portions identified by the information contained in the selection set have already been selected; if not, it will execute phase P2 again to select a second image portion; otherwise, said apparatus 1 will make a third choice S3. In order to make this third choice S3, the apparatus 1 verifies if conditions exist for ending the execution of the method; if no such conditions exist (which may be generated, for example, through the input/output means 14), it will execute phase P1 again to acquire a new image; otherwise, it will end the execution of the method.

It must be pointed out that, in the implementation of the invention, phases P1,P2 and P4,P5 can be carried out in accordance with the prior art.

It must also be pointed out that all the phases of the method according to the invention can be carried out in an overlapped sequential manner, i.e., the apparatus 1 will already start the execution of a new phase of the method when even just a part of the results of a previous phase of said method is available and final (i.e., no longer subject to change). In this way, it is possible to increase the level of parallelism while reducing the time needed by the apparatus 1 for executing the method on a particular image or set of images.

Figure 3:
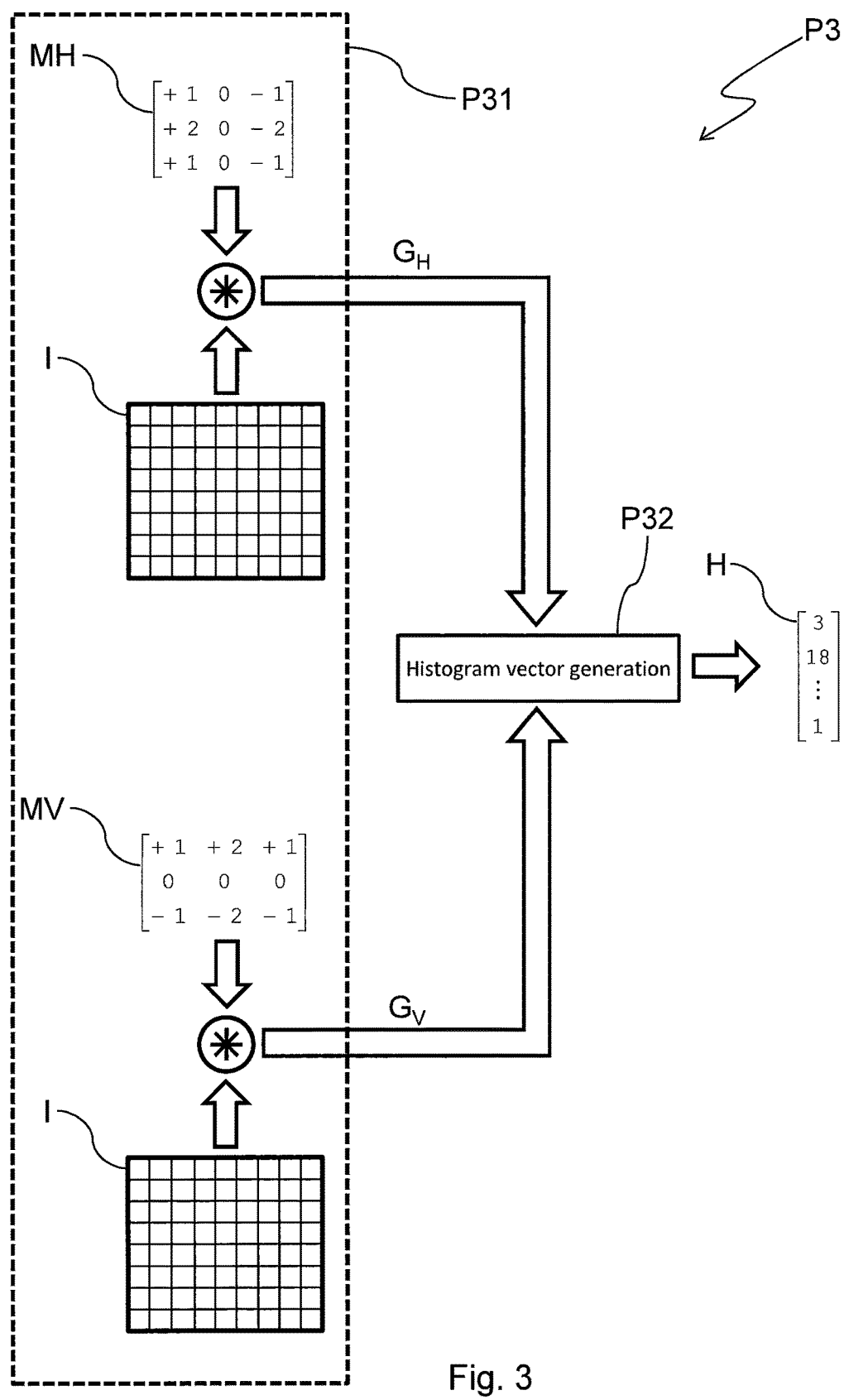
FIG. 3 shows one possible way in which, during the histogram determination phase of FIG. 2, the horizontal and vertical gradients of an image can be computed.

Also with reference to FIG. 3, the following will describe how a preferred embodiment of the apparatus 1 can implement the histogram generation phase P3 according to the invention.

Phase P3 may preferably comprise a gradient determination subphase P31 to determine the gradient of an image I (or a portion thereof) that was previously acquired during phase P1 by the image acquisition means 13; during said subphase P31, the computing means 11 may preferably compute, for each point of the image I, the horizontal gradient and the vertical gradient, so as to determine the gradient vector in the two-dimensional space. In particular, the computing means 11 are preferably configured for performing a spatial convolution between a first matrix MH, preferably having a value of 3×3 and having values in the central column all equal to zero, and the image I, so as to generate a matrix of vertical gradients GV having the same dimensions as the image I; besides, said computing means 11 are preferably also configured for performing a spatial convolution between a second matrix MV, preferably having a value of 3×3 and values in the central row all equal to zero, and the image I, so as to generate a matrix of horizontal gradients GH having the same dimensions as the image I.

It will nevertheless be possible for the man skilled in the art to perform the computation of the horizontal and vertical gradient components by using different techniques (e.g., to perform a convolution between the image I and each one of the vectors $[+1\ 0\ -1], [+1\ 0\ -1]^T$ or $[+1\ -1], [+1\ -1]^T$), without however departing from the teachings of the present invention.

Phase P3 comprises also a histogram vector determination subphase P32, wherein a histogram vector H is computed, through the computing means 11, on the basis of the gradient values contained in the matrices GV and GH.

Figure 4:
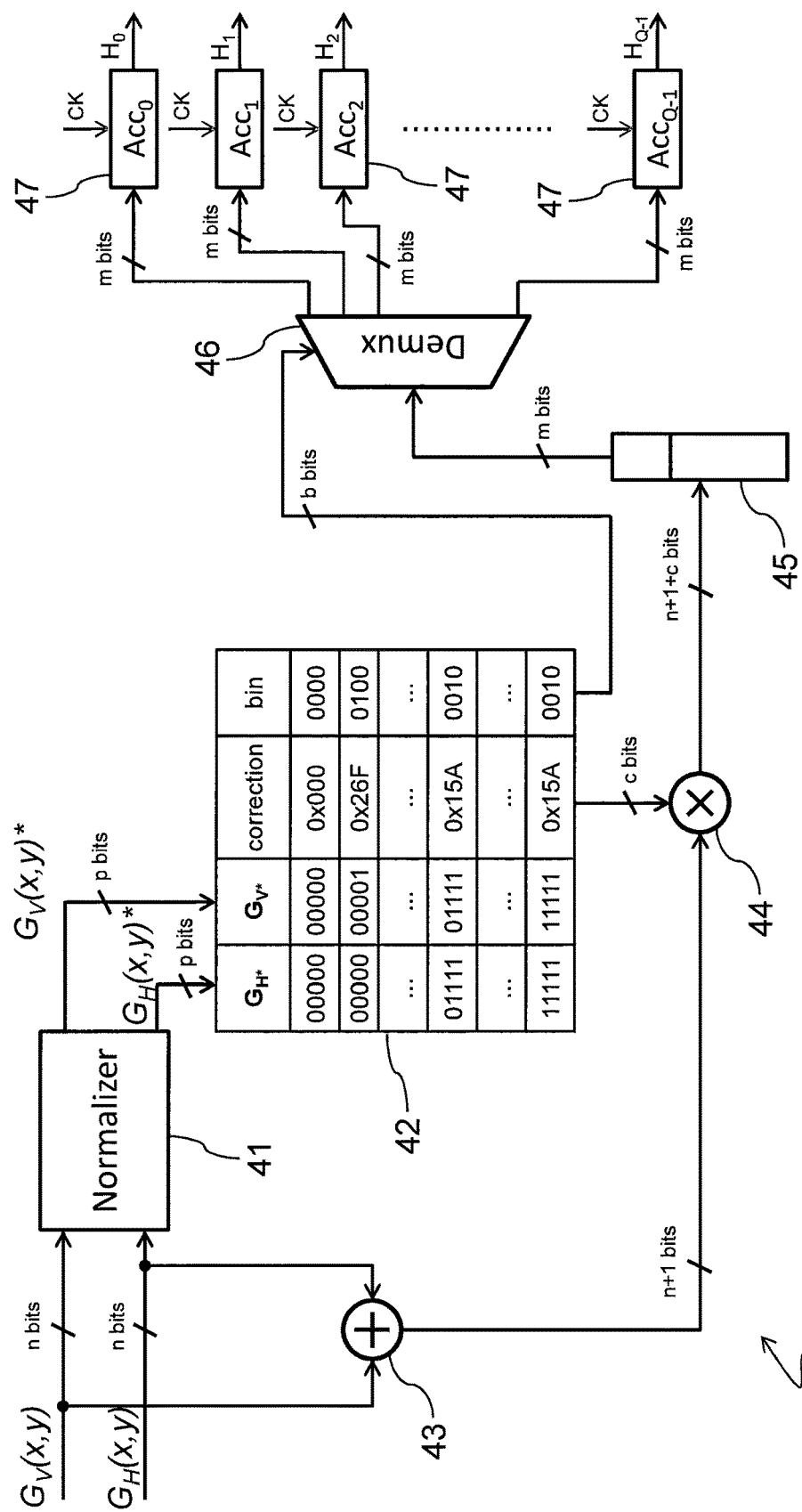
FIG. 4 shows a logic scheme that implements the histogram vector determination subphase of FIG. 3 in accordance with the invention.

Also with reference to FIG. 4, the following will describe in detail how the apparatus 1 can compute the histogram vector H during the subphase P32.

For each point of the image I, the apparatus 1 reads the horizontal and vertical components of the gradient of said point, wherein said gradient components are represented in FIG. 4 by the symbols $G_H(x, y)$ and $G_V(x, y)$, respectively, where x and y are the generic coordinates of the point of the image I; such components are preferably coded in a binary manner and represented by means of a fixed-point representation; furthermore, the components with a negative value can be represented in two's complement, thus advantageously reducing the complexity of the required circuitry and/or components. The representation of the gradient components is preferably made by using a number of bits n which is greater than the number of bits used for representing the value of the point in the image I; more in detail, the number of additional bits required for representing each one of the gradient components (with no information loss) is equal to the number of addition and subtraction operations that are necessary for computing each one of said components starting from the points of the image I. For example, if the MH and MV matrices of FIG. 3 are used, it will be necessary to use seven additional bits, in that five additions for each point of the image I and two bit shifts towards the most significant bit are required for the products by −2 and 2 (note that the products by the factors −1, 1 can be executed without any information losses and without adding any bits, if the input datum is already in two's complement); if the above-mentioned vectors are used, instead, one additional bit will suffice, in that one algebraic addition is enough for each point of the image I.

The apparatus 1 may also comprise normalizing means 41, which receive as inputs the gradient components $G_H(x, y)$ and $G_V(x, y)$ and output normalized values $G_H(x, y)^*$ and $G_V(x, y)^*$ of such components, wherein said normalized values are represented by a number of bits p, preferably equal to 5 bits, which is preferably smaller than n, i.e., the normalized values are represented by a smaller number of bits than is used for the gradient components $G_H(x, y)$ and $G_V(x, y)$. More in detail, the normalizing means 41 are configured for carrying out the following phases:

- a shifting phase N1, wherein the absolute binary values of both gradient components (i.e., values not represented in two's complement) are shifted towards the most significant bit (i.e., multiplied by $2_{10}$) by the same number of positions for both components, until the most significant bit of at least one of said components has a binary logic value of '1' (note that no information loss occurs in this phase); it must also be pointed out that, if the negative numbers were represented in two's complement, both components should be shifted towards the most significant bit by the same number of positions, until the result of the exclusive OR (XOR) operation between the most significant bits of each component is '1'.
- a truncation phase N2, wherein the least significant bits are truncated from the binary values obtained after the execution of phase N1, so as to obtain a length of p bits.

It must be highlighted that it is important that the above-described procedure is carried out by taking into account both components of the gradient, so that the number of discarded bits is equal for both components and the discarded bits have the same weight for both of the original components.

The normalizing means 41 can be implemented through a suitable sequence of instructions to be executed by the computing means 11, or through a suitable circuitry, whether made especially for this purpose or integrated into a CPLD, an FPGA, or the like.

The technical effects produced by the above-described normalizing means 41 will be clarified below.

As aforesaid, the memory means 12 are used for implementing a look-up table 42 organized in a manner such that the key of said table comprises the gradient characteristics, which in this embodiment comprise the horizontal and vertical gradient components, represented in FIG. 4 as the contents of the columns identified by the symbols $G_H^*$ and $G_V^*$. The content of the look-up table 42 associated with the above-described key comprises the data set used for the quantization of the gradient angle, wherein said data set comprises the identifiers of the predetermined partitioning elements (bins) that are represented in FIG. 4 as the content of a column identified by the string 'bin'; optionally, said data set further comprises data (also referred to as correction factors, for reasons that will be clarified below) that can be used for computing the moduli of the gradients associated with the points of the image I, wherein said data are represented in FIG. 4 as the content of a column identified by the string 'correction'.

It must be pointed out that the gradient components $G_H^*, G_V^*$, which compose the key, are preferably represented in binary form in two's complement and with a length preferably equal to p bits, i.e., equal to those outputted by the normalizing means 41 that address said table 42; instead, the correction factors (which are always positive) and the identifiers of the partitioning elements are represented in binary form with a length of c and b bits, respectively.

When the apparatus 1 is in operation, the memory means 12, preferably of the associative type, receive as inputs the horizontal and vertical components of the gradient of one point of the image I, preferably normalized by the normalizing means 41, and output the value that identifies the partitioning element associated with the gradient angle and, optionally, the correction factor.

The data outputted by the table 42 are then used for computing the various components of the histogram vector H, wherein the latter can be computed, in fact, on the basis of the value of the identifier of the partitioning element and the value of the gradient components $G_H(x, y)$ and $G_V(x, y)$. It is in fact possible to compute the modulus of the gradient on the basis of the components $G_H(x, y)$ and $G_V(x, y)$ by using the theorem of Pythagoras, while it is possible to select the component of the histogram vector H to which the value of said modulus is to be added on the basis of the value of the identifier of the partitioning element outputted by the table 42.

In order to perform the operations for computing the histogram vector H, the apparatus 1 may also comprise a demultiplexer 46 and a plurality of accumulation registers 47 ($Acc_0$, $Acc_1$, ..., $Acc_{Q-1}$), wherein each one of said accumulation registers 47 has its input in signal communication with an output of said demultiplexer 46, and wherein the input of said demultiplexer 46 receives, through its data port, the value of the gradient modulus computed on the basis of the components $G_H(x, y)$, $G_V(x, y)$ and, through its selection port, the value of the identifier of the partitioning element, so that said demultiplexer 46 can set the modulus value at the input of the appropriate accumulation register 47, which, at every clock cycle CK, will add the value at its input to the value in its memory, and will then update its output value.

It must be highlighted that the number of accumulation registers is Q, the value of Q being necessarily smaller than $2^b$, i.e., the maximum number of bins identifiable by b bits.

The man skilled in the art may use alternative means other than the demultiplexer 46 and the accumulation registers 47 (e.g., a series of instructions executed by the computing means 11), without however departing from the teachings of the present invention.

Aiming at speeding up even more the entity detection process carried out by the apparatus 1, the computation of the gradient modulus may be carried out by utilizing, instead of the theorem of Phythagoras, the look-up table 42 and the correction factor contained therein, wherein the latter can be calculated when the apparatus 1 is not in operation (off-line) as will be described below.

It is known, in fact, that gradient components can be computed by means of the following relations:

$$G_H(x, y) = G(x, y) \cdot \cos(\alpha)$$

$$G_V(x, y) = G(x, y) \cdot sen(\alpha) \quad (1)$$

where $G(x, y)$ is the modulus of the gradient vector of a generic point having coordinates x,y in the image I, and $\alpha$ is the angle formed between the gradient vector and the positive semi-axis of the abscissas.

By adding the horizontal component $G_H(x, y)$ to the vertical one $G_V(x, y)$, it becomes possible to write the following relation:

$$G_H(x, y) + G_V(x, y) = G(x, y) \cdot \cos(\alpha) + G(x, y) \cdot sen(\alpha) \quad (2)$$

By grouping the gradient modulus, it becomes possible to write this further relation:

$$G_H(x, y) + G_V(x, y) = G(x, y) \cdot (\cos(\alpha) + sen(\alpha)) \quad (3)$$

By resolving the above-mentioned relation with respect to the gradient modulus, the following formula can be written:

$$G(x, y) = (G_H(x, y) + G_V(x, y)) \cdot \frac{1}{\cos(\alpha) + sen(\alpha)} \quad (4)$$

In the above formula 4, two distinct parts can be identified: the left one (i.e., the sum of the two gradient components) represents the part that must be executed when the apparatus 1 is in operation (on-line), whereas the right part (the inverse of the sum of the cosine of the angle α and the sine of said angle α) can be executed when the apparatus 1 is not in operation (off-line). Therefore, the correction factor to be entered into the memory means 12 can be calculated on the basis of the gradient angle α (which in turn can be determined on the basis of the value of the components of said gradient), with the following relations:

$$\text{correction} = \frac{1}{\cos(\alpha) + sen(\alpha)} \quad (5)$$

$$\alpha = \begin{cases} 0 & \text{if } G_H^* = G_V^* = 0 \\ \arccos\left(\frac{G_H^*}{\sqrt{G_H^{*2} + G_V^{*2}}}\right) & \text{if } G_V^* \geq 0 \\ -\arccos\left(\frac{G_H^*}{\sqrt{G_H^{*2} + G_V^{*2}}}\right) & \text{if } G_V^* < 0 \end{cases}$$

where $G_H$ and $G_V$ indicate the horizontal and vertical components of the gradient that constitute the key of the look-up table 42, and hence may take all values of the normalized gradient components $G_H(x, y)^*$ and $G_V(x, y)^*$.

As concerns the identifier of the partitioning element to be assigned to each pair of gradient components, said identifier can be computed by means of the following relation:

$$bin(\alpha) = \left(\frac{\alpha}{\pi} numBin\right) \% \; numBin \quad (6)$$

where the symbol '%' refers to the remainder (i.e., an integer) of the division between the two operands, whereas the symbol 'numBin' indicates the chosen number of partitioning elements to be used, said number being equal to Q, which is the number of components of the histogram vector H, preferably 8. It must be pointed out that the angle α is divided by π because, in those applications where SVM is used for entity detection, only the gradient angles between 0 and 180 degrees are taken into account, as opposed to 0 to 360 degrees, since the purpose is to outline the contour of an object (which is perpendicular to the gradient), and it is therefore unimportant to know the gradient direction, i.e., whether it is "entering" or "exiting" the contour.

In order to be able to compute the modulus of the gradient without having to carry out any floating-point operation, the apparatus 1 may also preferably comprise an adder 43, a multiplier 44 and a truncation register 45, wherein the adder 43 and the multiplier 44 are both, preferably, of the fixed-point type.

The adder 43 receives as inputs the values of the gradient components $G_H(x, y)$ and $G_V(x, y)$, and then calculates, preferably in an asynchronous manner (i.e., without needing a clock), the algebraic sum of such components, thus outputting a result of n+1 bits, i.e., preferably 10 bits. It must be pointed out that the representation in two's complement of the gradient components allows using an adder for adding together also numbers having different signs, advantageously not requiring the use of a subtractor and of the necessary selection logic.

The value outputted by the adder 43 is then inputted to the multiplier 44, which, since it also receives the correction factor outputted by the memory means 12, provides the product between the sum of the gradient components and the correction factor associated with such components, wherein said product represents the modulus of the gradient, which requires a number of n+1+c bits, i.e., preferably 22 bits, in order to be represented with no precision losses. It must be highlighted that also the multiplier 44 preferably operates asynchronously (i.e., without needing a clock), for reasons that will be further clarified below.

Since the precision of the number of bits outputted by the multiplier 44 is normally too high for any application of the method according to the invention, the output of the multiplier 44 is inputted to a truncation register 45, which, by truncating the least significant bits, will reduce the number of bits to a value of m bits (preferably 10). This value of the gradient modulus is then inputted to the demultiplexer 46, which will then address such value to the accumulation register 47 selected through the b bits of the identifier of the partitioning element that was selected in the memory means 12 by means of the values of the normalized gradient components $G_H(x, y)^*$ and $G_V(x, y)^*$.

With this approach, no floating-point calculations need to be made when the apparatus 1 is in operation, thus making it possible to improve its efficiency in terms of time (i.e. less time required for processing one point of the image I) and space (e.g., less silicon occupation, because it is not necessary to implement new floating-point components or to use existing ones). In this manner, it is possible to increase the number of images processed by the apparatus 1 per time unit or, the time being equal, to increase the resolution of said processed images, thus reducing to a minimum the number of false positives/negatives when detecting entities in the image I.

At this point, one can appreciate the technical effect produced by the normalizing means 41. In fact, assuming that p is 5, the number of values that can be represented for each one of the normalized gradient components $G_H(x, y)^*$, $G_V(x, y)^*$ will be 32 (25); therefore, when computing every possible combination between the two components, the number of rows that the look-up table 42 will have to contain and manage will be equal to 1024 (210). If the normalizing means 41 were not used, instead, each gradient component $G_H(x, y), G_V(x, y)$ would be represented by n bits and, assuming that n is 9, it could take 512 different values that would require the look-up table 42 to manage a number of 262144 (218) rows, i.e., a number 256 (28) times greater than the above-described preferred case.

Therefore, the presence of the normalizing means 41 allows reducing the complexity in time and space of this phase of the method according to the invention, making it advantageously possible to increase the number of images processed by the apparatus 1 per time unit or, the time being equal, to increase the resolution of said processed image, thus reducing to a minimum the number of false positives/negatives when detecting entities in the image I.

In order to make the entity detection process carried out by the apparatus 1 even faster and more accurate, the computation of the gradient modulus can be replaced with the computation of the projection of the gradient on the partitioning element identified by means of the gradient angle.

In order to implement this technical feature, it will be sufficient to compute (off-line) the conversion factor of the look-up table 42 as follows:

$$\text{correction} = \frac{\cos(\alpha - \beta(bin(\alpha)))}{\cos(\alpha) + sen(\alpha)} \quad (7)$$

where β(bin(α)) is the angle of the partitioning element that must be associated with the gradient with angle α, i.e., the angle of the partitioning element (bin) on which the gradient with angle α must be projected. In this manner, one can calculate the projection of the gradient modulus on the appropriate partitioning element, thereby improving the accuracy of the method according to the invention because a greater amount of the information contained in the normalized gradient components $G_H(x, y)^*$ and $G_V(x, y)^*$ can be utilized, thus reducing to a minimum the number of false positives/negatives when detecting entities in the image I.

As partly mentioned above, the components 41-46 may preferably be implemented in an asynchronous manner, i.e., without needing a clock to operate. When an input is applied to one of these components, this will provide a stable output after a stabilization time, said stabilization time being known and dependent on the type of component in use, or computable on the basis of the sub-components used for creating said component and their configuration (arrangement, connections, or the like). One possible consequence will be that the total stabilization time of the asynchronous part of FIG. 4 will be equal to either the sum of the stabilization times of the normalizing means, the look-up table 42 and the demultiplexer 46 or the sum of the stabilization times of the adder 43, the multiplier 44, the truncation register 45 and the demultiplexer 46, whichever is greater.

The total stabilization time should preferably be shorter than the clock period or a fraction thereof, so that, when the accumulation registers 47 are activated by the clock CK (e.g., by its leading edge and/or trailing edge), the outputs of the demultiplexer 46 will have already become stable.

The man skilled in the art may employ synchronous components 41-46 (e.g., by implementing the invention through a pipeline), without however departing from the teachings of the present invention.

In summary, when the embodiment of the apparatus 1 is in operation and is starting the execution of the histogram vector determination subphase P32, the computing means 1 preferably reset the accumulation registers 47 (e.g., by varying a suitable signal, e.g., by imposing a high or low input voltage on a port of the register, or the like), so that the value stored therein will be set to the initial one, which is preferably 0. Afterwards or at the same time, the values of the components $G_H(x, y)$ and $G_V(x, y)$ of the gradient of a first point of the image I are inputted to the normalizing means 41 and to the adder 43, so that the normalizing means can output the normalized components $G_H(x, y)^*$ and $G_V(x, y)^*$ and the adder 43 can output the sum of the gradient components $G_H(x, y)$ and $G_V(x, y)$. At this point, the look-up table 42, which receives as inputs the normalized components $G_H(x, y)^*$ and $G_V(x, y)^*$, can output valid values for the identifier of the partitioning element and for the correction factor, so that the multiplier 44, being inputted a valid correction factor, can output a valid value representing the modulus of the gradient or the projection of said modulus on the partitioning element associated with the values of the gradient components. It is therefore possible for the truncation register, as it receives a valid input, to produce also a valid output allowing the demultiplexer 46 to produce a valid output for the accumulation registers 47, which, being subsequently activated by the clock CK, will update their internal status and hence the various components of the histogram vector H. The cycle will then be repeated, with the normalizing means 41 and the adder 43 being inputted the values of the components $G_H(x, y)$ and $G_V(x, y)$ of the gradient of a second point of the image I, until the clock CK will activate again the accumulation registers 47, and so on until the components of the gradient of the last point of the image I will have been processed.

Of course, the example described so far may be subject to many variations.

A first variation of the above-described preferred embodiment allows computing the projection of the gradient modulus not only on a first partitioning element identified by means of the gradient angle, but also on a second partitioning element close to the first one, i.e., the other element (bin) that delimits the space partition in the plane.

In order to implement this feature, an apparatus similar to the apparatus 1 of the previous embodiment must comprise memory means, preferably of the associative type, configured for implementing a look-up table similar to the table 42 of the previous embodiment, which also comprises two additional columns associated with the same key; such additional columns contain the identifier of the secondary partitioning element and the correction factor for computing the projection of the gradient modulus on said secondary partitioning element. Furthermore, in order to process these additional data more easily, the apparatus may also comprise a second multiplier receiving as inputs the second conversion factor and the output of the adder 43, a second truncation register receiving as input the output of the second adder, a second demultiplexer receiving as inputs the output of the truncation register and the identifier of the secondary partitioning element. It must be pointed out that, for adding a second demultiplexer to the one already included in the previous embodiment, it is possible to connect each output of the demultiplexer to the respective input of the appropriate accumulation register 47 by using OR logic ports, relying on the fact that the identifiers of the partitioning elements that are simultaneously outputted by the look-up table, i.e., by the memory means, are never the same.

This variant improves the accuracy of the method according to the invention because it exploits a greater amount of the information present in the normalized gradient components $G_H(x, y)^*$ and $G_V(x, y)^*$, thus reducing to a minimum the number of false positives/negatives when detecting entities in the image I.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus adapted to detect entities in a numerical image comprising a plurality of points, comprising:
   computing means configured for:
      reading or determining at least one piece of gradient information relating to one of the points of the image,
      generating a histogram vector on the basis of at least said gradient information and of partitioning elements with reference to which at least said gradient information is quantized, and detecting, based on said histogram vector, the presence of at least one of said entities in the image, and signaling means in signal communication with the computing means, and configured for being activated when said computing means detect the presence of at least one of said entities in the image, and memory means containing at least a plurality of pieces of partitioning information, and configured for allowing access to at least one of said pieces of partitioning information on the basis of said gradient information, and wherein each one of said pieces of partitioning information identifies at least one of said partitioning elements allowing the quantization of said gradient information, so as to allow the generation of the histogram vector.

2. The apparatus according to claim 1, wherein the gradient information comprises the vertical $G_V(x, y)$ and horizontal $G_H(x, y)$ gradient values associated with said point of the image.

3. The apparatus according to claim 2, wherein the memory means contain also a plurality of pieces of modulus information comprising correction factors, wherein said memory means are also configured for allowing access to at least one of said pieces of modulus information on the basis of said gradient information, and wherein each correction factor allows computing the modulus of the gradient associated with said point of the image, by multiplying said correction factor by the sum of the vertical ($G_V(x, y)$) and horizontal ($G_H(x, y)$) gradient values.

4. The apparatus according to claim 2, wherein the memory means contain also a plurality of pieces of projection information, and are also configured for allowing access to at least one of said pieces of projection information on the basis of said gradient information, and wherein each piece of projection information comprises a first correction factor that allows computing the modulus of the projection of the gradient associated with said point of the image on the partitioning element obtained from the memory means on the basis of said gradient information, by multiplying said correction factor by the sum of the vertical ($G_V(x, y)$) and horizontal ($G_H(x, y)$) gradient values.

5. The apparatus according to claim 4, wherein each one of said pieces of partitioning information comprises also a second partitioning element, and wherein each piece of projection information comprises also a second correction factor that allows computing the modulus of the projection of the gradient associated with said point of the image on said second partitioning element, by multiplying said second correction factor by the sum of the vertical ($G_V(x, y)$) and horizontal ($G_H(x, y)$) gradient values.

6. The apparatus according to claim 2, comprising normalizing means configured for being inputted the vertical $G_V(x, y)$ and horizontal $G_H(x, y)$ gradient values and for outputting a pair of normalized values ($G_H(x, y)^*$, $G_V(x, y)^*$), which are used for accessing the memory means, and wherein said normalized values are generated by subjecting both the vertical and horizontal gradient values ($G_V(x, y)$, $G_H(x, y)$) to the same number of binary shifts towards the most significant bit and to a truncation of the same number of least significant bits.

7. The method for detecting entities in a numerical image comprising a plurality of points, comprising a gradient determination phase, for reading or computing at least one piece of gradient information relating to one of the points of the image, a histogram generation phase, for generating a histogram vector on the basis of at least said gradient information and of partitioning elements with reference to which at least said gradient information is quantized, an entity detection phase, for detecting, based on said histogram vector, the presence of at least one of said entities in the image, an entity presence signaling phase, wherein, if during the entity detection phase the presence of at least one entities is detected in the image, said presence will be signaled by means for signaling, wherein during the histogram generation phase the partitioning elements are selected on the basis of at least said gradient information.

8. The method according to claim 7, wherein the gradient information comprises the vertical $G_V(x, y)$ and horizontal $G_H(x, y)$ gradient values associated with said point of the image.

9. The method according to claim 8, wherein, during the histogram generation phase, modulus information comprising correction factors is also selected along with said partitioning elements, and wherein each correction factor allows computing the modulus of the gradient associated with said point of the image, by multiplying said correction factor by the sum of the vertical ($G_V(x, y)$) and horizontal ($G_H(x, y)$) gradient values.

10. The method according to claim 8, wherein, during the histogram generation phase, projection information is also selected along with said partitioning elements, and wherein each piece of projection information comprises a first correction factor that allows computing the modulus of the projection of the gradient associated with said point of the image on the partitioning element associated with said gradient information, by multiplying said correction factor by the sum of the vertical ($G_V(x, y)$) and horizontal ($G_H(x, y)$) gradient values.

11. The method according to claim 10, wherein, during the histogram generation phase, a second partitioning element is also selected along with each one of said partitioning elements, and wherein each piece of projection information comprises a second correction factor that allows computing the modulus of the projection of the gradient associated with said point of the image on said second partitioning element, by multiplying said second correction factor by the sum of the vertical ($G_V(x, y)$) and horizontal ($G_H(x, y)$) gradient values.

12. The method according to claim 7, wherein, during the histogram generation phase, the vertical $G_V(x, y)$ and horizontal $G_H(x, y)$ gradient values are transformed into a pair of normalized values ($G_H(x, y)^*$, $G_V(x, y)^*$), which are used for selecting the partitioning elements, and wherein said normalized values are generated by subjecting both the vertical and horizontal gradient values ($G_V(x, y)$, $G_H(x, y)$) to the same number of binary shifts towards the most significant bit and to a truncation of the same number of least significant bits.

13. A non-transitory computer readable medium comprising instructions that, when executed by a processor, perform the method according to claim 7.

* * * * *